April 13, 1937.  H. T. LEBOW  2,077,334
CULTIVATOR
Filed April 22, 1936    2 Sheets-Sheet 1
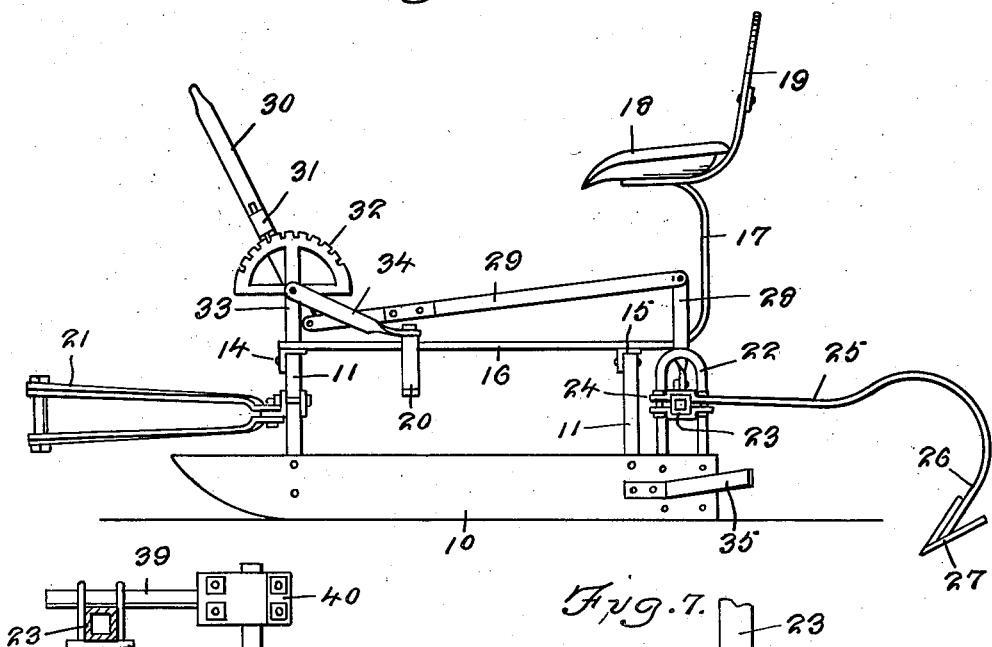
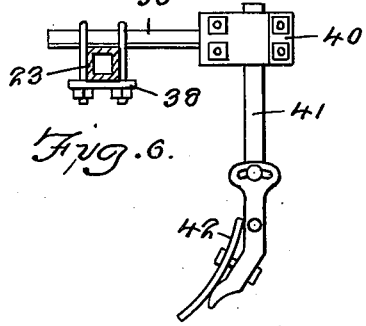
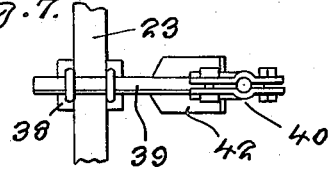
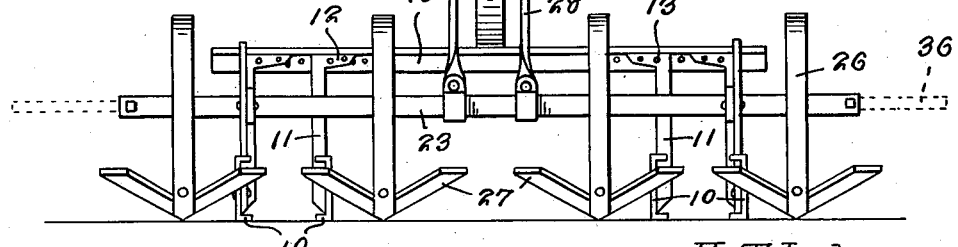

April 13, 1937. H. T. LEBOW 2,077,334
CULTIVATOR
Filed April 22, 1936 2 Sheets-Sheet 2
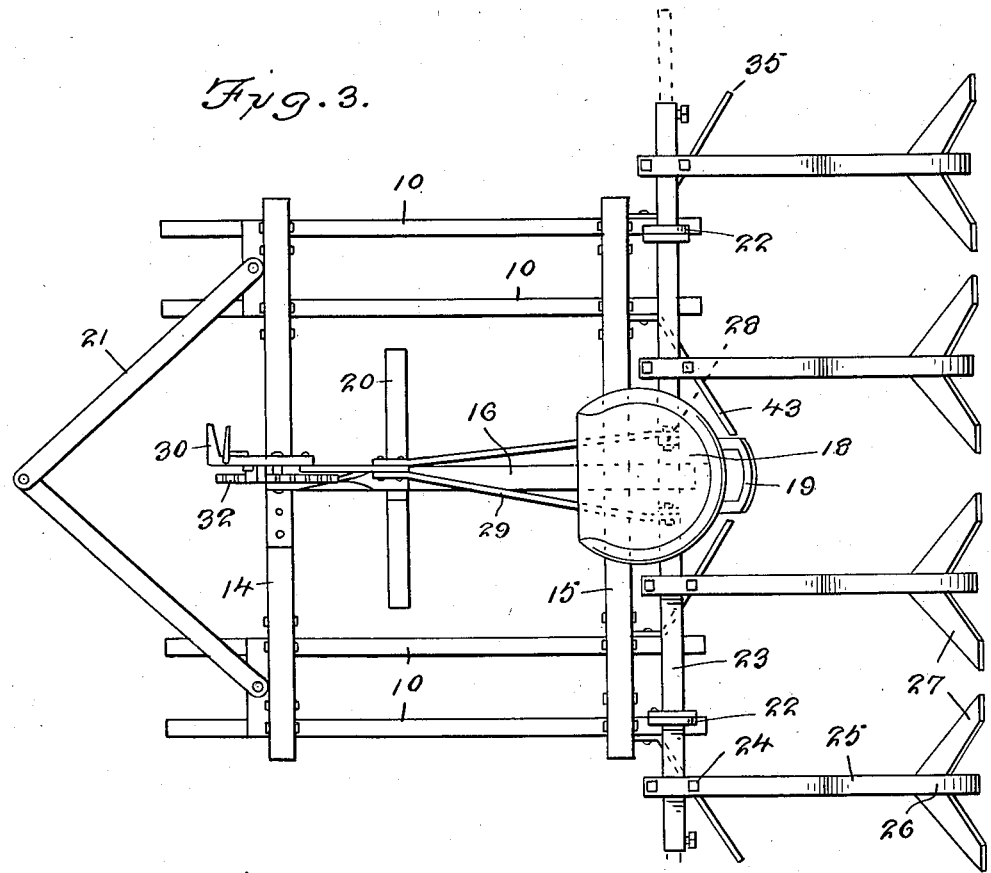
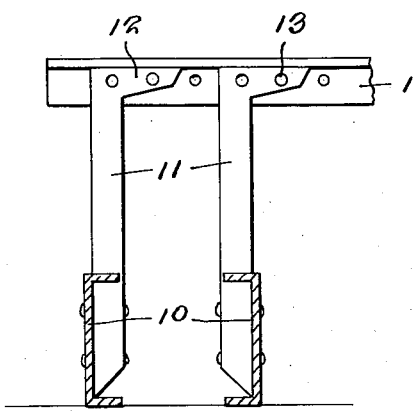
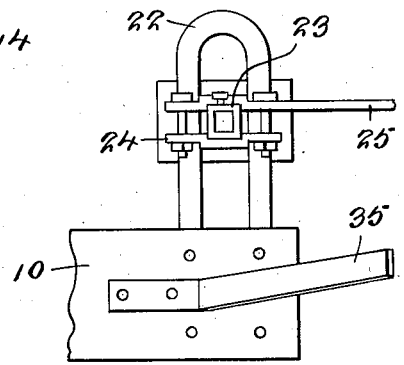
H. T. Lebow
INVENTOR
BY Victor J. Evans & Co.
ATTORNEY Patented Apr. 13, 1937

2,077,334

UNITED STATES PATENT OFFICE 2,077,334

CULTIVATOR

Henry T. Lebow, Flomot, Tex.

Application April 22, 1936, Serial No. 75,799

2 Claims. (Cl. 97—140)

The invention relates to a farming implement and more especially to a two-row cultivator.

The primary object of the invention is the provision of an implement of this character, wherein through the use of runners such cultivator can slide over the ground for the cutting of the soil through knife blades, thereby such soil can be properly worked both before and after planting.

Another object of the invention is the provision of an implement of this character, wherein the construction thereof is novel in form and by which the soil can be properly cultivated and the depth of cutting action of the blades can be regulated and such soil operated upon will be properly worked for thorough cultivation of the same.

A further object of the invention is the provision of an implement of this character, which is simple in construction, thoroughly reliable and effective in its operation, enabling cultivation to be carried forth with dispatch, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of an implement constructed in accordance with the invention.

Figure 2 is a rear elevation.

Figure 3 is a top plan view.

Figure 4 is a fragmentary vertical transverse sectional view.

Figure 5 is an enlarged fragmentary side elevation showing the manner of attaching supplemental blades to the implement.

Figure 6 is a fragmentary vertical longitudinal sectional view showing a shovel attachment for the implement.

Figure 7 is a top plan view of the structure shown in Figure 6.

Similar reference characters indicate corresponding parts throughout the several views in the drawings.

Referring to the drawings in detail, the implement comprises pairs of spaced parallel runners 10 from which rise uprights 11, these at their upper ends having the lateral extensions 12 and through the medium of fasteners 13 the same are adjustably engaged with front and rear cross angle pieces 14 and 15, respectively, while disposed at the longitudinal center of the implement and suitably fixed to these pieces 14 and 15 is a strip-like bar 16 having at its rear end a seat post 17 carrying a seat 18 equipped with a backrest 19. Forwardly of the seat 18 and fastened to the bar 16 is a foot rest 20.

Attached to the uprights 11 supporting the front piece 14 is a draft rigging 21 for either a tractor or for draft animals.

Fixed to the outermost runners 10 of the pairs in rear of the rear cross piece 15 are upstanding bearings 22 for a draw bar 23 which is hollow and of square formation in cross section while clipped at 24 to this draw bar 23 are arms 25 carrying at their downwardly and forwardly curved lower ends 26 substantially V-shaped blades 27, the draw bar 23 being mounted in the bearings 22 for turning movement and to effect this there is attached thereto an arm 28 to which is pivoted a link 29 the same being also pivoted to a throw lever 30 carrying a hand released latch 31 engageable with a toothed keeper segment 32 of a bracket 33 fixed to the front cross piece 14, the lever 30 being pivoted for swinging movement to said bracket so that the blades 27 can be raised and lowered relative to a ground surface and latched in adjusted position. The bracket 33 has attached thereto a brace 34 which is also fastened to the foot rest 20.

Secured to the outermost runners 10 of the pairs close to their rear ends are laterally extending angled guards 35.

Engageable in opposite ends of the draw bar 23 are supplemental extensions 36 so that this draw bar can be equipped with an increased number of ground working tools, as for example, the arms 25 carrying the blades 27.

In Figures 6 and 7 of the drawings there is shown a slight modification wherein through the use of clips 38 pipe-like sections 39 can be fastened to the draw bar 23 while through the medium of the coupling 40 the leg 41 can be attached and this leg carries an adjustable shovel or plow shaft 42 which may be substituted for the blade 27 serviceable in cultivating the soil.

Guards 43 similar to the guards 35 are arranged on the innermost of the pairs of runners 10.

It is preferable that the runners 10 be of the shape as shown in the drawings, that is to say, the front ends of these runners are gradually curved in a rearward direction similarly to sled runners so as to permit of the forward draft of the implement and allowing the runners to ride over obstructions in the line of draft thereof.

What is claimed is:

1. An implement of the character described comprising pairs of spaced parallel runners, uprights rising from said runners, cross pieces carried by the uprights, bearings rising from the outermost of the pairs of runners, a hollow draw bar of squared formation in cross section rotatably journaled in said bearings, ground working elements carried by said draw bar, means supported by one of the cross pieces and connected with the draw bar for rotating the same and locking it in adjusted position, means for adjustably connecting the uprights with the cross pieces, guards extending laterally from the inner and outer runners of said pairs at the rear ends thereof, and extensions adjustably engaged in opposite ends of the said draw bar.

2. An implement of the character described comprising pairs of spaced parallel runners, uprights rising from said runners, cross pieces carried by the uprights, bearings rising from the outermost of the pairs of runners, a hollow draw bar of squared formation in cross section rotatably journaled in said bearings, ground working elements carried by said draw bar, means supported by one of the cross pieces and connected with the draw bar for rotating the same and locking it in adjusted position, means for adjustably connecting the uprights with the cross pieces, guards extending laterally from the inner and outer runners of said pairs at the rear ends thereof, extensions adjustably engaged in opposite ends of the said draw bar, and a strip-like bar arranged at the longitudinal center of the implement and fixed to said cross pieces and having a seat support at its rear end.

HENRY T. LEBOW.